(12) United States Patent
Golov

(10) Patent No.: US 11,544,412 B2
(45) Date of Patent: Jan. 3, 2023

(54) PROTECTION AGAINST UNINTENDED CONTENT CHANGE IN DRAM DURING STANDBY MODE

(71) Applicant: Micron Technology, Inc., Boise, ID (US)

(72) Inventor: Gil Golov, Backnang (DE)

(73) Assignee: Micron Technology, Inc., Boise, ID (US)

(*) Notice: Subject to any disclaimer, the term of this patent is extended or adjusted under 35 U.S.C. 154(b) by 105 days.

(21) Appl. No.: 16/991,855

(22) Filed: Aug. 12, 2020

(65) Prior Publication Data

US 2022/0050926 A1     Feb. 17, 2022

(51) Int. Cl.

| | |
|---|---|
| *G06F 15/177* | (2006.01) |
| *G06F 21/64* | (2013.01) |
| *G06F 9/4401* | (2018.01) |
| *G06F 3/06* | (2006.01) |
| *G06F 21/60* | (2013.01) |
| *G06N 20/00* | (2019.01) |
| *B60R 25/01* | (2013.01) |
| *B60R 25/24* | (2013.01) |
| *H04L 9/08* | (2006.01) |
| *G06F 1/3234* | (2019.01) |

(52) U.S. Cl.
CPC ............ *G06F 21/64* (2013.01); *B60R 25/01* (2013.01); *B60R 25/24* (2013.01); *G06F 3/0619* (2013.01); *G06F 3/0659* (2013.01); *G06F 3/0679* (2013.01); *G06F 9/4418* (2013.01); *G06F 21/602* (2013.01); *G06N 20/00* (2019.01); *H04L 9/0894* (2013.01); *G06F 1/3234* (2013.01); *G06F 9/4401* (2013.01)

(58) Field of Classification Search
USPC .......................................................... 713/2
See application file for complete search history.

(56) References Cited

U.S. PATENT DOCUMENTS

| | | | |
|---|---|---|---|
| 6,694,451 B2 * | 2/2004 | Atkinson | G06F 11/1004 714/21 |
| 7,260,758 B1 | 8/2007 | Agrawal et al. | |
| 8,438,377 B2 * | 5/2013 | Senda | G06F 21/575 713/153 |
| 8,978,135 B2 | 3/2015 | Pearson et al. | |
| 9,003,252 B1 | 4/2015 | Aharoni et al. | |

(Continued)

*Primary Examiner* — Volvick Derose
(74) *Attorney, Agent, or Firm* — Greenberg Traurig

(57) ABSTRACT

Systems, methods, and apparatus related to protecting data stored in volatile memory of a computing system during a standby mode. In one approach, a first signature is generated for data stored in volatile memory. In some cases, the stored data may include sensor data obtained from one or more sensors of a vehicle, mobile device or other electronic device. The first signature is stored in a non-volatile memory device, and then the computing system enters the standby mode. Subsequently, after exiting the standby mode, a second signature is generated for the data stored in the volatile memory. The first signature is read from the non-volatile memory device and compared to the second signature. A signature mismatch indicates that an unintended change has occurred in the stored data during the standby mode. One or more remedial actions are performed by the computing system in response to this signature mismatch.

19 Claims, 6 Drawing Sheets

(56) References Cited

U.S. PATENT DOCUMENTS

| | | | |
|---|---|---|---|
| 9,639,425 B1* | 5/2017 | Mishra | G06F 11/2284 |
| 9,959,124 B1* | 5/2018 | Herbeck | G06F 9/4418 |
| 10,185,633 B2* | 1/2019 | Branco | G06F 21/57 |
| 2002/0056056 A1 | 5/2002 | Bannatyne et al. | |
| 2003/0014686 A1* | 1/2003 | Barth, Jr. | G11C 29/44 |
| | | | 714/6.32 |
| 2013/0212413 A1* | 8/2013 | Berndt | G06F 11/3006 |
| | | | 713/310 |
| 2014/0082724 A1* | 3/2014 | Pearson | G06F 21/575 |
| | | | 726/22 |
| 2014/0129888 A1 | 5/2014 | Chickanosky et al. | |
| 2016/0105286 A1* | 4/2016 | Li | H04L 9/14 |
| | | | 380/286 |
| 2016/0147542 A1* | 5/2016 | Kishi | G06F 9/4418 |
| | | | 713/2 |
| 2017/0332032 A1* | 11/2017 | Park | H04N 21/2402 |
| 2017/0353305 A1* | 12/2017 | Glickman | H04L 9/0891 |
| 2022/0008367 A1* | 1/2022 | Skobieranda | A61P 25/00 |

* cited by examiner

PROTECTION AGAINST UNINTENDED CONTENT CHANGE IN DRAM DURING STANDBY MODE

FIELD OF THE TECHNOLOGY

At least some embodiments disclosed herein relate to computing systems in general, and more particularly, but not limited to protecting data stored in volatile memory of a computing system when in a standby mode.

BACKGROUND

In some cases, computing systems are configured to transition between different power states, ranging from a full power-on state to a fully-off state. These different power states are typically used to conserve power.

In one example, a suspend-to-RAM power state is sometimes used to reduce power consumption. Operation can be quickly resumed by exiting the suspend-to-RAM power state and returning to a fully-on state (e.g., resuming faster than otherwise possible when performing a cold boot from a fully-off state). In a suspend-to RAM power state, a computing system can retain a state or states in random access memory of platform software (e.g., an operating system (OS) and/or applications) that is running when the computing system initiates its transition to the suspend-to-RAM state.

When the computing system resumes or exits the suspend-to-RAM state to a fully-on power state, the computing system does not need to execute the entire platform's boot software as is required when performing a cold boot from a fully-off state. In some cases, failure to execute the entire platform boot software upon resume can introduce a security risk because the system memory may be compromised while it is in the suspend-to-RAM power state. For example, malicious code can be written to memory regions storing the operating state(s) of the platform software. Upon resume from the suspend-to-RAM state, the compromised platform software could be executed, and allow an attacker to take control of the system or to otherwise compromise the system.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
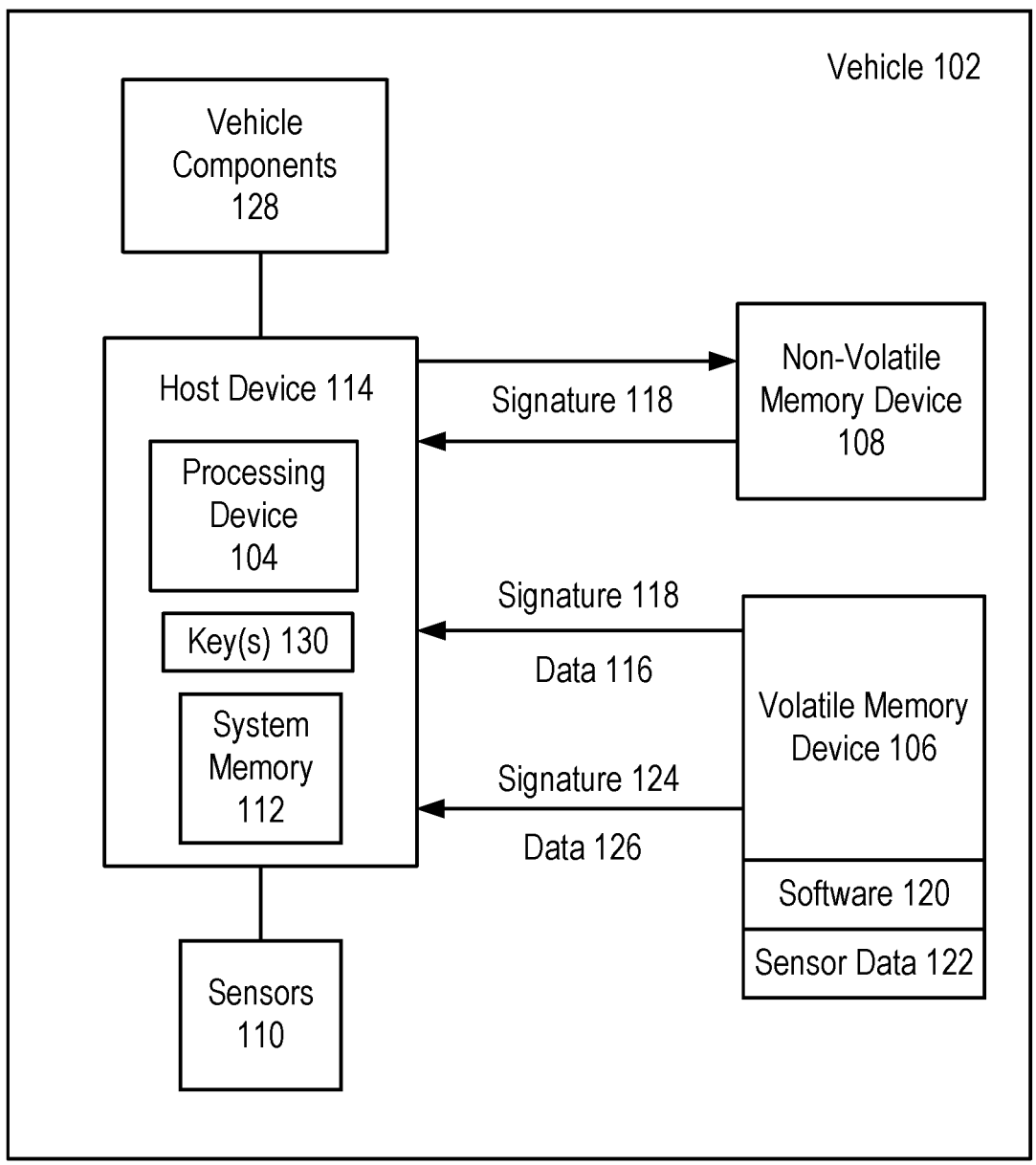
FIG. 1 shows a vehicle including a host device that protects data stored in a volatile memory device when in a standby mode, in accordance with some embodiments.

The following disclosure describes various embodiments for protecting data stored in volatile memory of a computing system when in a standby mode. At least some embodiments herein relate to evaluating a signature of the stored data to determine whether an unintended change in the data has occurred during the standby mode. Examples of the unintended change include data loss due to bit flips, or malicious modification of data by a computer hacker.

As used herein, a "standby mode" includes, for example, a sleep mode, a suspend-to-RAM mode, a hibernation mode, and other low-power modes used in electronic devices such as vehicles, computers, mobile devices, and televisions. In one example, a standby mode is a mode of a computing device in which one or more functions of the computing device are disabled to reduce power consumption. In one example, a standby mode is entered when power consumed by a volatile memory device is reduced, and/or one or more functions of a host that uses the volatile memory as system memory are suspended until normal operation is later resumed again.

In some computing systems, a DRAM (e.g., a DRAM memory device) supports a standby mode in which the content of the memory is automatically refreshed by the DRAM without the need for a host to generate refresh commands or clocks. When in the standby mode, the DRAM consumes low power and enables a system's hibernation or sleep, and also a fast recovery after a full-system power up. Having a system in hibernation or sleep by use of a DRAM standby mode is widely used in automotive ECUs and mobile devices, and saves the lengthy process of a full system boot.

However, in some cases, the DRAM can be in standby mode for a long period of time, sometimes days. Unintended modification of the DRAM content might happen during standby mode due to various reasons. In some cases, a hacker might get physical access to a DRAM bus in the system, exit the standby mode, get control of the DRAM, change the content of the DRAM, and then enter standby mode again. When the host returns to normal operation, the host might execute the modified DRAM data.

In other cases, DRAM bit flips may occur. The longer the time period that the DRAM is in the standby mode, the greater the probability of a bit flip.

Various embodiments of the present disclosure provide a technological solution to one or more of the above technical problems. In some embodiments, a mechanism is provided on a system level to detect and protect unintended DRAM content change during a standby mode.

In one embodiment, before entering a standby mode, a DRAM content signature of the relevant memory region(s) that is required to be validated during standby mode is determined. In one approach, if the DRAM has an internal mechanism to generate a content signature, a host will send a command to the DRAM (e.g., to a controller of a DRAM device) to calculate the data signature of the required data region(s), and then read back the result(s) (e.g., one or more signatures can be determined for each region(s)). In another approach, if the DRAM doesn't contain an internal mechanism to generate a content signature(s), the host itself calculates the content signature(s). In one example, the host reads the entire data set that needs to be validated from DRAM, and then calculates the signature(s).

Next, each signature is determined by calculating a hash function on the entire dataset (e.g., all data stored in a given region of volatile memory to be protected). Other examples of determining a signature include the use of a hash function, a cyclic redundancy check (CRC), and/or an error correction code (ECC). The calculation result of the foregoing is the data signature. In some cases, one signature is determined by the DRAM (CRC) and a second signature is determined by the host (ECC), depending on the type of data (e.g., a criticality level of the data for the system operation).

After determining the signature(s) above (e.g., by the DRAM and/or the host), the signature is stored in a non-volatile memory (e.g., a NAND flash memory device). In one embodiment, the signature is encrypted by the host. In one example, the signature is encrypted using keys that were stored in the host prior to storing the signature into the non-volatile memory.

After storing the signature in the non-volatile memory, the host causes the DRAM to enter the standby mode. Then, some or all of the rest of the computing system is powered down. In one example, the computer system stays in the standby mode for at least 1-10 hours, or 1-10 days.

After being in the standby mode, the computer system exits the standby mode. In one embodiment, the computer system exits the standby mode after receiving a wake-up signal. As part of exiting the standby mode, the system sends a command to the DRAM to exit standby mode (e.g., causing resumption of power to one or more circuits of the DRAM that were shut down during the standby mode).

After exiting the standby mode, the system determines a new signature for the content of the DRAM. In one example, the new signature is determined using the same approach as described above.

Also, the host reads the prior signature that is stored in the non-volatile memory. If the prior signature was encrypted, then the prior signature is now decrypted.

The prior signature (that was stored in non-volatile memory) and the new signature (for the current DRAM content) are compared. If the signatures match, the system continues to execute the software that was previously running in the system by using the current content of the DRAM to return to the prior existing state of the system prior to entering standby mode. For example, the system exits hibernation and performs a fast system recovery.

In one example of system recovery, the computing system rapidly starts up and becomes operational using the content stored in a DRAM memory device. In low power standby modes (e.g., a hibernation or sleep mode), a portion of the normal function of the computing system is disabled (e.g., the system is in an abnormal state different from a state for normal operation). The system is able to recover its normal, full functionality of the state existing just before the system entered the standby mode. An advantage is that recovery using the data saved in DRAM is faster than re-booting the system, and/or reading data from non-volatile memory.

If the prior and new signatures do not match, this indicates that an unintended change of the DRAM content has occurred during the standby mode. In one embodiment, this is an error that is logged in the non-volatile memory, and/or the error is reported (e.g. by wireless communication) to a server in a cloud network. In response to the signature mismatch, a full reset and boot of the system is executed from the non-volatile memory.

In one embodiment, a standby mode is used in automotive systems such as for infotainment systems. The standby mode avoids a lengthy boot process of the infotainment system (e.g., after a shut-down or power off). In one example, when a driver switches off a vehicle such as a car that includes an infotainment system, a DRAM device that contains software and the current states of the infotainment system goes into a standby mode. When the driver switches on the car again, the infotainment system leaves the standby mode, and then continues running from the same point that the system was left in when entering the standby mode.

FIG. 1 shows a vehicle 102 including a host device 114 that protects data stored in a volatile memory device 106 when in a standby mode, in accordance with some embodiments. To protect the stored data, a signature 118 is determined for data stored in volatile memory device 106 prior to entering the standby mode. In one example, a signature is determined for one or more identified regions of volatile memory device 106. In one example, the identified regions correspond to a portion of a logical or physical address range for data stored in volatile memory device 106.

Signature 118 can be determined by volatile memory device 106 or host device 114. If signature 118 is determined by device 106, then host device 114 sends a command to volatile memory device 106 that causes generation of signature 118. Then, host device 114 reads signature 118 from device 106.

If signature 118 is determined by host device 114, then host device 114 reads data 116 from volatile memory device 106. Then, processing device 104 calculates signature 118. In some embodiments, keys 130 are stored in memory of host device 114 and used by processing device 104 to encrypt signature 118.

The calculated signature 118 (optionally encrypted as discussed above) is written to non-volatile memory device 108 for storage during the standby mode. In one example, after storing signature 118 in non-volatile memory device 108, processing device 104 causes host device 114 to enter a standby mode. As part of entering the standby mode, processing device 104 signals volatile memory device 106 to enter a standby mode. In one example, power consumption by volatile memory device 106 is reduced in the standby mode. In one example, sufficient power is provided to volatile memory device 106 to retain data content stored in the identified regions that are protected by signature 118.

In one embodiment, host device 114 includes system memory 112 used by processing device 104 in executing various software applications, and for storing data used by these applications. In one example, volatile memory device 106 provides data storage for a portion or all of an address space corresponding to system memory 112.

Volatile memory device 106 may store software 120 executed by process device 104, and/or store sensor data 122 obtained from sensors 110. In one example, sensors 110 include a camera, a lidar, a radar, and/or a microphone. Data obtained from sensors 110 is used by processing device 104 in controlling one or more vehicle components 128. In one example, vehicle components 128 include an anti-lock braking system, a steering control system, a navigation system, and/or engine control system.

After being in standby mode, host device 114 exits the standby mode. In one example, processing device 104 receives a signal that causes exiting from the standby mode. In one example, the signal is a command from another computing device of vehicle 102 and/or a remote computing device (e.g., edge server).

In one embodiment, sensors 110 remain powered during the standby mode. In one example, a wake-up signal is received from one or more of sensors 110 in response to a determination by the one or more sensors 110 of a change in the context of operation for vehicle 102. In one example, the context is determined based on an output from a machine-learning model of sensor(s) 110. In one example, the context is a determination that an object is approaching vehicle 102.

After exiting the standby mode, a new signature 124 is generated based on the then-existing content of data stored in volatile memory device 106. In one example, signature 124 is generated for data stored in the regions previously identified and protected by signature 118. As mentioned above, the signature 124 can be determined by volatile memory device 106 or host device 114. If host device 114 determines the signature 124, then data 126 is read from the identified regions previously protected by signature 118. Then, processing device 104 determines signature 124.

The prior signature 118 is read by processing device 104 from non-volatile memory device 108. If signature 118 was encrypted prior to storage in non-volatile memory device 108, processing device 104 decrypts signature 118 using key(s) 130.

Processing device 104 compares prior signature 118 and new signature 124. Based on a result of this comparison, processing device 104 performs one or more actions regarding the protected data.

If signatures 118 and 124 match, then host device 114 resumes normal operation. In one example, this normal operation includes using software 120 and/or sensor data 122 to control one or more functions of vehicle components 128. In one example, resuming normal operation includes returning host device 114 and/or vehicle 102 to a state that existed just prior to entering the standby mode.

If signatures 118 and 124 do not match, then processing device 104 initiates a restart of host device 114 by booting using data stored in non-volatile memory device 108.

In one example, a volatile memory device (e.g., DRAM device) having data of a computing device (e.g., a mobile device) protected as described above stores data used by a host as system memory (e.g., the host can be in an autonomous vehicle or a mobile device, or in another computing device that accesses data stored in volatile memory). In one example, the volatile memory device is cross-point memory used in an electronic control unit of an electric vehicle, and data in memory region(s) of the cross-point memory is protected by a signature(s).

In one example of a standby mode, a state (e.g., an operating system state for a host device) for a computing device (e.g., a mobile device) is held in RAM (e.g., DRAM) and, when placed in the standby mode, the computing device reduces power to un-needed subsystems and places the RAM into a minimum power state that is sufficient to retain its data. The computing device can be configured to automatically enter the standby mode when the device is running on batteries, and has not been used by a user for a predetermined period of time, or if a physical component of the device is in a predetermined position (e.g., a lid of a laptop is closed).

In one embodiment, a computing device can be configured to consume some energy while in a standby mode (e.g., while sleeping) in order to power the RAM, and for responding to a wake-up event (e.g., receiving a signal to exit the standby mode). The computing device exits the standby mode in response to a signal to do so. Examples include a wake-up press of a power button by a user, or wake signals from a keyboard, mouse, an incoming call or message, or a signal received over a local area or other network.

Figure 2:
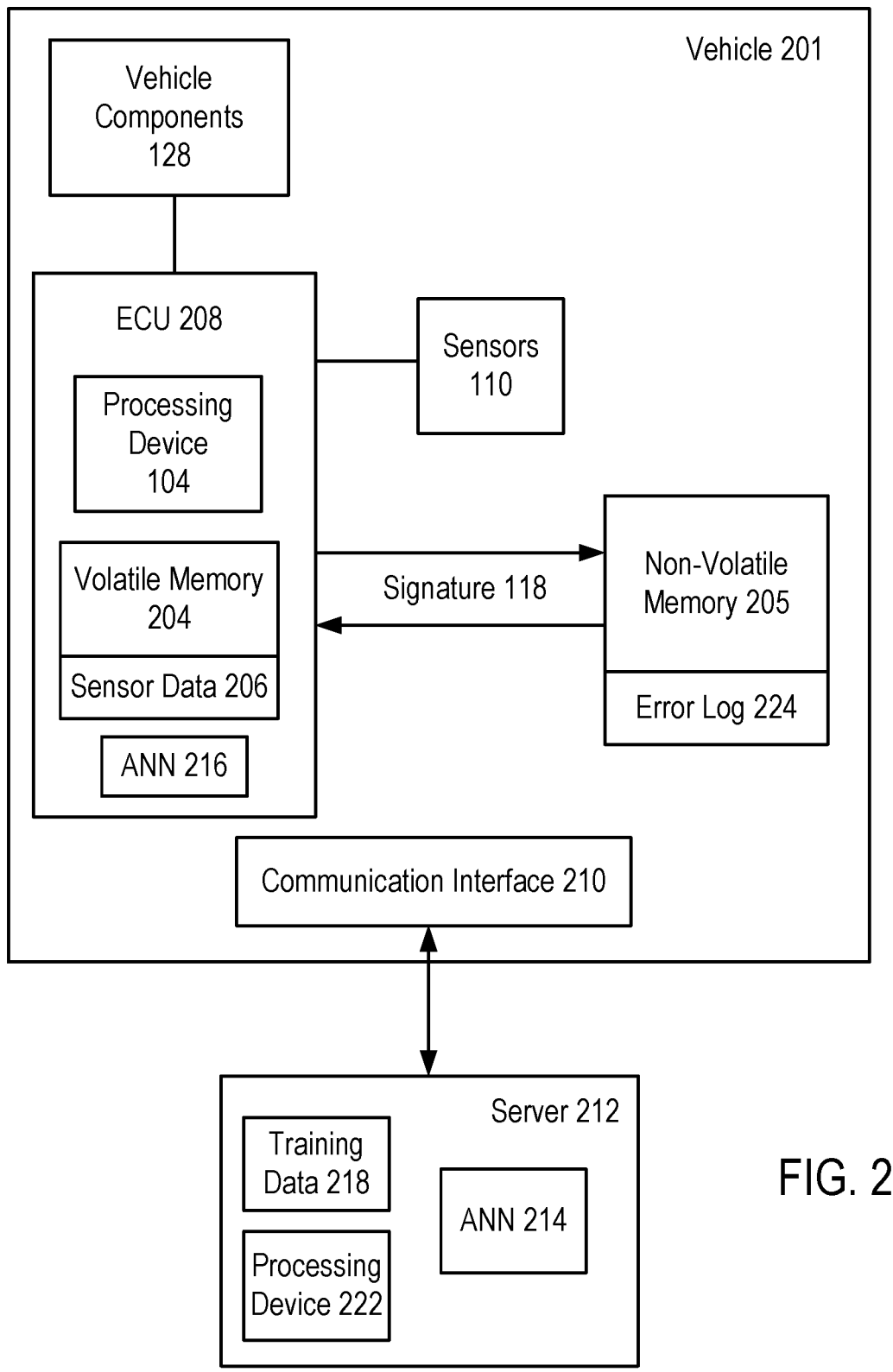
FIG. 2 shows a vehicle that protects data stored in volatile memory and communicates with a server over a communication interface, in accordance with some embodiments.

FIG. 2 shows a vehicle 201 that protects data stored in volatile memory 204 and communicates with server 212 over communication interface 210, in accordance with some embodiments. Vehicle 201 is an example of vehicle 102. In one example, volatile memory 204 is a DRAM memory device(s) (e.g., one or more die or chips). In one example, communications interface 210 includes a wireless transceiver that communicates with server 212 (e.g., using 4G or 5G cellular communications).

Electronic control unit (ECU) 208 controls one or more functions of vehicle components 128. Sensors 110 provide data to ECU 208 that is stored as sensor data 206 in volatile memory 204 and/or non-volatile memory 205.

Processing device 104 of ECU 208 uses an artificial neural network (ANN) 216 to provide results used by processing device 104 to send control signals to vehicle components 128 (e.g., on a CAN bus of vehicle 201). ANN 216 uses at least sensor data 206 as an input.

Processing device 104 uses data stored in volatile memory 204 during normal operation. In one example, this data includes an operating system, software applications, and/or data used by the operating system or software applications in controlling vehicle components 128.

In one embodiment, regions of volatile memory 204 are identified by processing device 104 for protection prior to entering a standby mode. In one example, the one or more identified regions include regions that store sensor data 206. In one example, the one or more identified regions include data that represents the state of ECU 208 prior to entering the standby mode. In one example, the identified regions include data that are needed by ECU 208 to resume normal operation after exiting the standby mode. In one example, one or more vehicle components 128 enter the standby mode as selected and/or controlled by ECU 208.

Processing device 104 determines signature 118 for the data in the identified regions of volatile memory 204. Processing device 104 writes signature 118 to non-volatile memory 205 for storage during the standby mode. After signature 118 is stored, processing device 104 causes ECU 208 and/or vehicle components 128 to enter the standby mode.

Processing device 104 causes exiting from the standby mode. In one example, the exiting is in response to receiving a wake-up signal. In one example, the exiting is in response to an output from ANN 216. In one example, the exiting is in response to a signal received by communication interface 210 from server 212. In one example, signal from server 212 is generated by ANN 214, which is executed by processing device 222.

After exiting the standby mode, processing device 104 generates a new signature for the data stored in the identified regions of volatile memory 204. This new signature is compared to signature 118 that is stored in non-volatile memory 205, similarly as was discussed above. Based on this comparison, one or more actions are performed by processing device 104 for vehicle 201. In one example, these actions include the actions discussed for vehicle 102 above.

In one example, if the new signature does not match signature 118, then processing device 104 stores the event as an error in error log 224 of non-volatile memory 205.

In one example, if the new signature does not match signature 118, processing device 104 sends a communication over communication interface 210 to server 212. In one example, the communication includes data used to update training data 218. In one example, training data 218 is used by processing device 222 to train ANN 214.

In one example, training data 218 is sent by server 212 to vehicle 201 for use by processing device 104 in training ANN 216. In one example, an output from ANN 214 is used to generate a wake-up signal sent to processing device 104, which causes exiting from the standby mode. In one example, ANN 214 uses data provided by one or more sensors 110 (e.g., for generating the wake-up signal). In one example, an output from ANN 214 is used by processing device 104 to control one or more functions of vehicle components 128.

Figure 3:
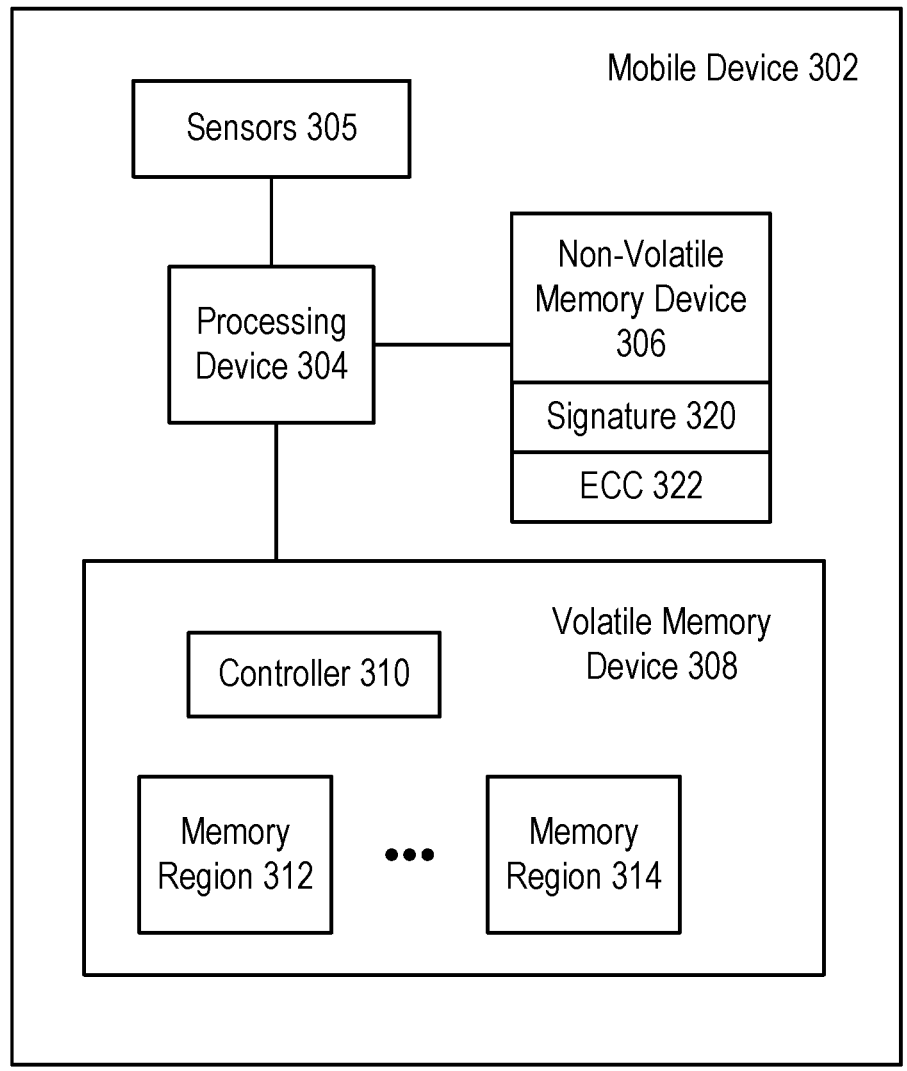
FIG. 3 shows a mobile device that collects data from sensors and protects data stored in a volatile memory device, in accordance with some embodiments.

FIG. 3 shows a mobile device 302 that collects data from sensors 304 and protects data stored in volatile memory device 308, in accordance with some embodiments. Signature 320 is obtained by processing device 304 for the data to be protected. Signature 320 is stored in non-volatile memory device 306 (e.g., similarly as described above). In one example, signature 320 is generated by controller 310 and sent to processing device 304 on a communications bus (not shown) (e.g., a serial data bus). In one example, the data to be protected is sent to processing device 304 and stored in local memory (not shown) of processing device 304, and signature 320 is generated using the data stored in the local memory.

Non-volatile memory device 306 is an example of non-volatile memory device 108, and volatile memory device 308 is an example of volatile memory device 106. In one example, the data is protected similarly as described for vehicle 102 or vehicle 201 above.

In one embodiment, an error correction code (ECC) 322 is generated by processing device 304 for the data to be protected. In one example, the data to be protected is retained in volatile memory device 308 during a standby mode, and is also stored in non-volatile memory device 306.

In one example, the protected data is combined with ECC 322 to provide codewords that are stored in non-volatile memory device 306. In the event that an unintended change occurs in data stored in volatile memory device 308, then ECC 322 can be used to recover at least a portion of the original data that existed prior to entering the standby mode.

In one embodiment, processing device 304 receives data from sensors 305. In one example, this data is stored in one or more memory regions 312, 314 of volatile memory device 308. In one example, controller 310 identifies memory region 312 for protection in a standby mode based on the sensor data stored in memory region 312. In one example, this identification is based on the type of sensor data and/or the particular one or more sensors 305 from which the data is obtained or generated (e.g., the identification of region is based on a source of the data stored in the region).

In one embodiment, a computing device (e.g., mobile device 302) determines a signature (e.g., signature 320) by calculating a short, fixed-length binary sequence, known as the check value or CRC, for each block of data (e.g., an identified region of volatile memory device 308) to be protected. When data is read (e.g., after exiting a standby mode), the device compares its check value with one freshly calculated from the data block. If the CRC values do not match, then the block contains a data error. The device may take corrective action, such as re-reading the block from another source (e.g., non-volatile memory 306 or server 212), or requesting that it be sent again from a server (e.g., in the cloud).

In some embodiments, processing of data (e.g., sensor or other data) is implemented using a cloud system (e.g., server 212 in a cloud network). In one example, a computing environment operates in conjunction with embodiments of the present disclosure. The components of the computing environment may be implemented using any desired combination of hardware and software components.

The exemplary computing environment may include a client computing device, a provider server, an authentication server, and/or a cloud component, which communicate with each other over a network (e.g., using communication interface 210).

The client computing device (e.g., mobile device 302) may be any computing device such as desktop computers, laptop computers, tablets, PDAs, smart phones, mobile phones, smart appliances, wearable devices, IoT devices, in-vehicle devices, and so on. According to various embodiments, the client computing device accesses services at the provider server (e.g., server 212).

The client computing device may include one or more input devices or interfaces for a user of the client computing device. For example, the one or more input devices or interfaces may include one or more of: a keyboard, a mouse, a trackpad, a trackball, a stylus, a touch screen, a hardware button of the client computing device, and the like. The client computing device may be configured to execute various applications (e.g., a web browser application) to access the network.

The provider server may be any computing device configured to host one or more applications/services (e.g., services provided using one or more ANNs). In some embodiments, the provider server may require security verifications before granting access to the services and/or resources provided thereon. In some embodiments, the applications/services may include online services that may be engaged once a device has authenticated its access. In some embodiments, the provider server may be configured with an authentication server for authenticating users and/or devices. In other embodiments, an authentication server may be configured remotely and/or independently from the provider server.

The network may be any type of network configured to provide communication between components of the cloud system. For example, the network may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of the cloud system. In other embodiments, one or more components of the cloud system may communicate directly through a dedicated communication link(s).

In various embodiments, the cloud system may also include one or more cloud components. The cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of the provider server and the authentication server may be configured to operate in or with cloud computing/architecture such as: infrastructure a service (IaaS), platform as a service (PaaS), and/or software as a service (SaaS).

Figure 4:
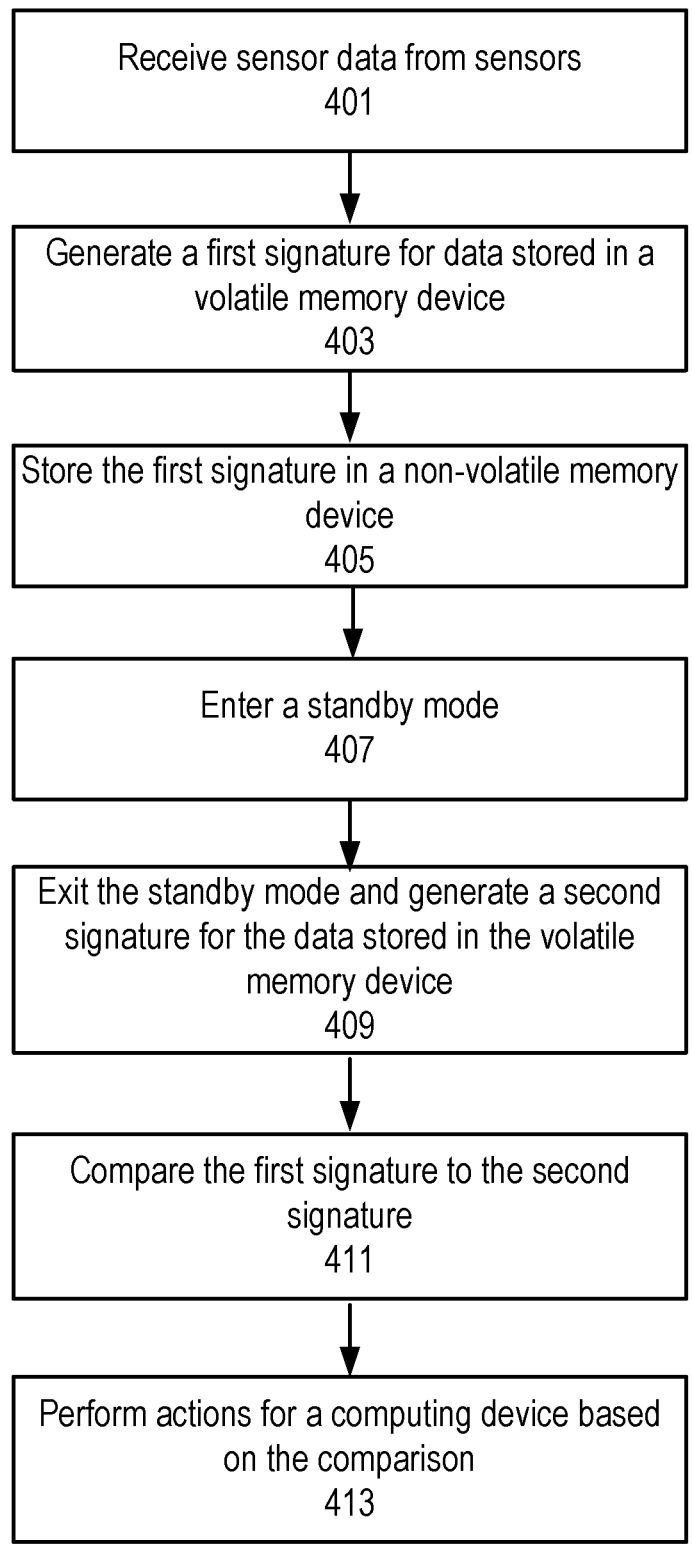
FIG. 4 shows a method for protecting data stored in volatile memory in a standby mode, in accordance with some embodiments.

FIG. 4 shows a method for protecting data stored in volatile memory during a standby mode, in accordance with some embodiments. For example, the method of FIG. 4 can be implemented in the system of FIG. 1. In one example, the volatile memory is volatile memory device 106.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, sensor data is received from one or more sensors. In one example, the sensor data is sensor data 122, 206. In one example, the sensors are sensors 110. The use of sensors is optional. Other embodiments may obtain data from sources other than sensors (e.g., a computing device of a vehicle other than a sensor).

At block 403, a first signature is generated for data stored in a volatile memory device. In one example, signature 118 is generated for data stored in volatile memory device 106.

At block 405, the first signature is stored in a non-volatile memory device. In one example, signature 118 is written to non-volatile memory device 108.

At block 407, a standby mode is entered. In one example, processing device 104 causes host device 114 and/or vehicle components 128 to enter a standby mode.

At block 409, the standby mode is exited. A second signature is generated for the data stored in the volatile memory device. In one example, the standby mode is exited in response to a signal from server 212. In one example, signature 124 is generated based on data 126 stored in volatile memory device 106 after exiting the standby mode.

At block 411, the first signature is compared to the second signature. In one example, signatures 118 and 124 are compared by processing device 104.

At block 413, based on the comparison, one or more actions are performed for a computing device (e.g., vehicle or mobile device). In one example, the action is a change in control of one or more vehicle components 128. In one example, a display on the user interface of mobile device 302 is updated based on the comparison. In one example, software stored in non-volatile memory device 306 is updated using an over-the-air (OTA) update in response to prior and new signatures failing to match for protected data in memory region 314.

Figure 5:
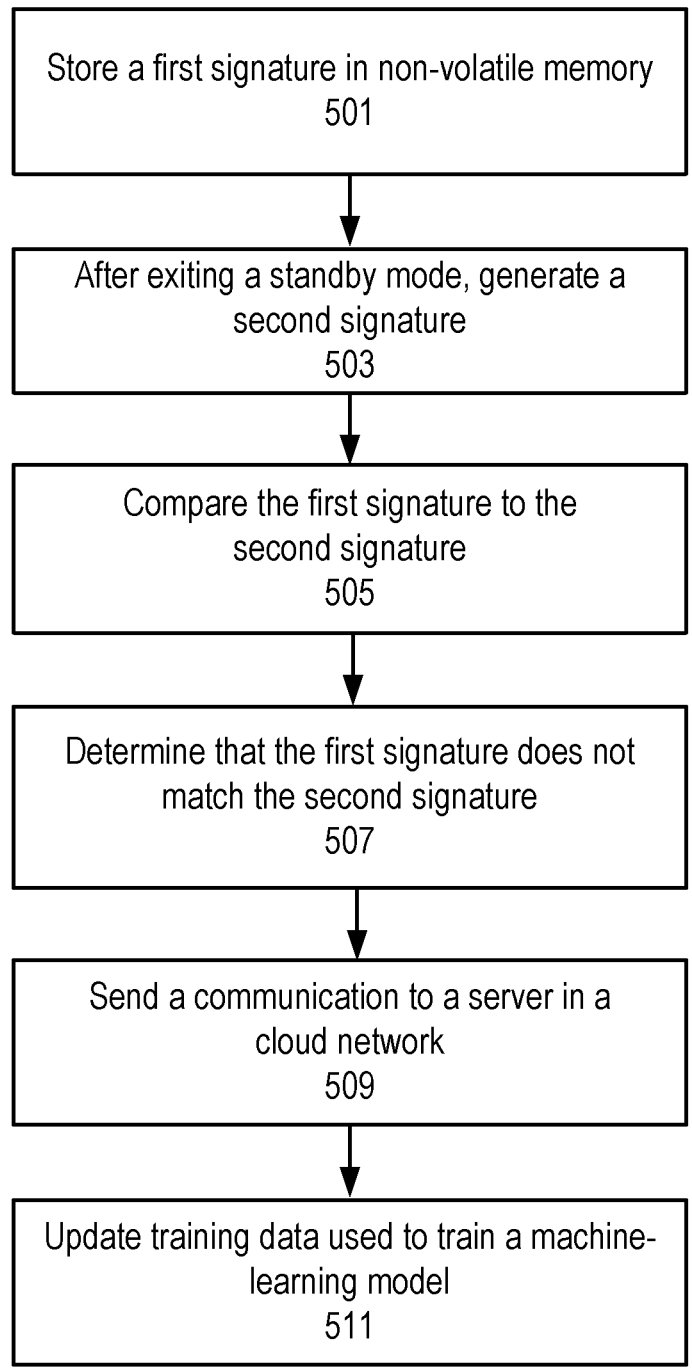
FIG. 5 shows a method for communicating with a server in a cloud network based on evaluation of a signature for data stored in volatile memory, in accordance with some embodiments.

FIG. 5 shows a method for communicating with a server in a cloud network based on evaluation of a signature for data stored in volatile memory, in accordance with some embodiments. For example, the method of FIG. 5 can be implemented in the system of FIG. 2. In one example, the volatile memory is volatile memory 204, the server is server 212.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., processing device 104 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, a first signature is stored in non-volatile memory. In one example, signature 118 is stored in non-volatile memory device 108.

At block 503, after exiting a standby mode, a second signature is generated. In one example, signature 124 is generated for data stored in volatile memory device 106.

At block 505, the first and second signatures are compared. In one example, processing device 104 compares signatures 118 and 124.

At block 507, it is determined that the first signature does not match the second signature. In one example, ECU 208 determines that the first and second signatures do not match, indicating an unintended change in data has occurred.

At block 509, in response to this determination, a communication is sent to a server (e.g., in a cloud network, or on a local area network). In one example, the communication is sent to server 212.

At block 511, training data used to train a machine-learning model is updated. In one example, training data 218 is updated based on sensor data 206 sent by processing device 104 in response to determining that the first signature does not match the second signature.

Figure 6:
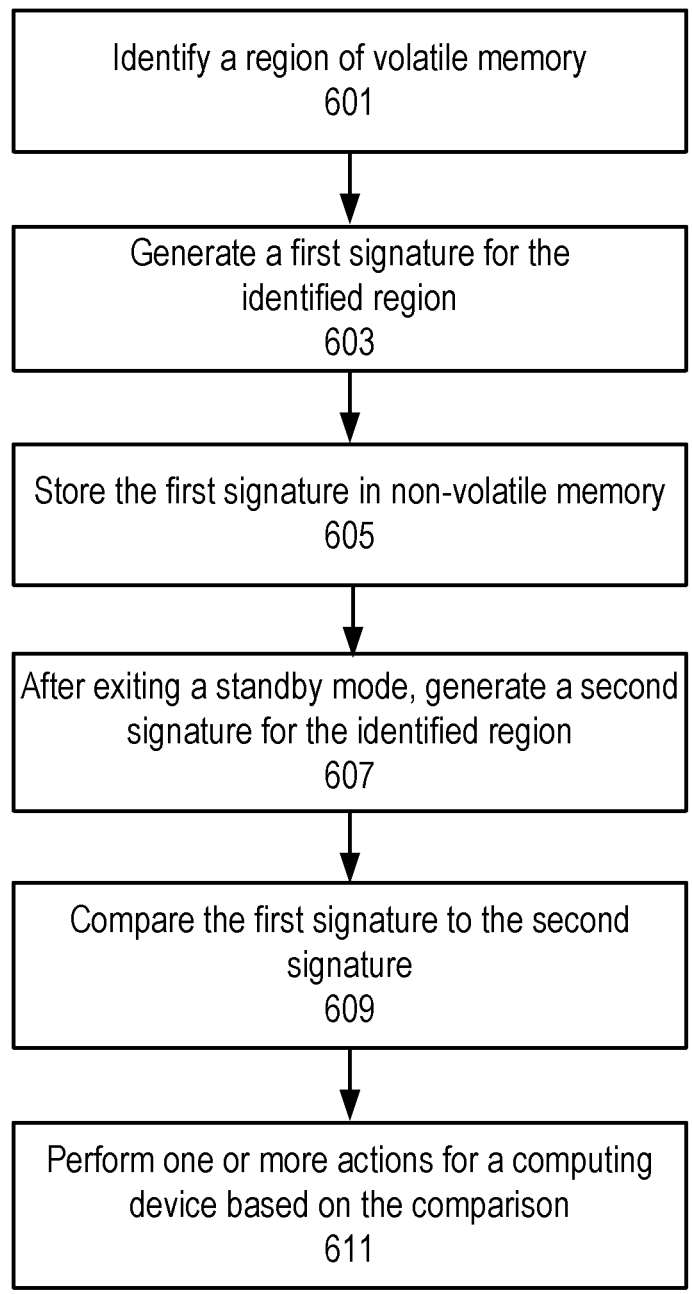
FIG. 6 shows a method for identifying regions of volatile memory to be protected in a standby mode, in accordance with some embodiments.

FIG. 6 shows a method for identifying regions of volatile memory to be protected in a standby mode, in accordance with some embodiments. For example, the method of FIG. 6 can be implemented in the system of FIG. 3. In one example, the volatile memory is volatile memory device 308.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., processing device 304 of FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, one or more regions of volatile memory are identified for data protection during a standby mode. In one example, memory region 312 and/or memory region 314 are identified.

At block 603, a first signature or signatures are generated for the one or more identified regions. In one example, a signature is generated for memory region 314, which stores sensor data from sensors 305.

At block 605, the first signature(s) is stored in non-volatile memory. Then, a standby mode is entered. In one example, signature 320 is generated for data in memory region 312, and signature 320 is stored in non-volatile memory device 306.

At block 607, the standby mode is exited. After exiting the standby mode, a second signature(s) is generated for the one or more identified regions. In one example, controller 310 generates a second signature for memory region 312 in response to a request by processing device 304.

At block 609, the first signature is compared to the second signature. In one example, the first signature is signature 320 (read from non-volatile memory device 306), which is compared to a second signature generated by processing device 304 for data read from memory region 312 after exiting the standby mode.

At block 611, one or actions are performed for a computing device based on the comparison. In one example, one or more functions of mobile device 302 are disabled or blocked in response to determining that the first and second signatures do not match. In one example, a security configuration for mobile device 302 is updated in response to a signature mismatch. In one example, in response to a signature mismatch, security software on mobile device 302 is updated by wireless communication with a server in a cloud network.

In one embodiment, a system includes: at least one processing device (e.g., 104); and memory containing instructions configured to instruct the at least one processing device to: receive sensor data (e.g., 122) from at least one sensor (e.g., 110) (and/or receive data from other sources in other embodiments); prior to entering a standby mode, generate a first signature (e.g., 118) for first data (e.g., 116) stored in a volatile memory device (e.g., 106), the first data including software executed to control at least one function based on the sensor (and/or other) data; store the first signature in a non-volatile memory device (e.g., 108); after storing the first signature, enter the standby mode; exit the standby mode; after exiting the standby mode, generate a second signature (e.g., 124) for the first data (e.g., 126) stored in the volatile memory device; read the first signature from the non-volatile memory device; compare the first signature to the second signature; and in response to comparing the first signature to the second signature, perform at least one action regarding the stored first data.

In one embodiment, the instructions are further configured to instruct the at least one processing device to: store at least one key (e.g., 130); and prior to storing the first signature in the non-volatile memory device, encrypt the first signature using the at least one key.

In one embodiment, a host device (e.g., 114) stores data in the volatile memory device and the non-volatile memory device; and the host device is powered down after the volatile memory device enters the standby mode.

In one embodiment, the at least one action includes, in response to determining that the first signature does not match the second signature, booting the host device by reading the first data from the non-volatile memory device.

In one embodiment, the at least one action further includes at least one of: sending, via a wireless network, a communication to a server (e.g., 212) in a cloud network, the communication indicating that the first signature does not match the second signature; logging (e.g., using error log 224), in the non-volatile memory device, that the first signature does not match the second signature; or updating, based on determining that the first signature does not match the second signature, training data (e.g., 218) used to train a machine-learning model (e.g., 214 and/or 216). An output from the machine-learning model is used to control the at least one function for a vehicle (e.g., control signals for vehicle components 128), and the updated training data includes at least a portion of the first data.

In one embodiment, the instructions are further configured to instruct the at least one processing device to: store at least one key; and prior to comparing the first signature to the second signature, decrypt, using the at least one key, the first signature read from the non-volatile memory device.

In one embodiment, comparing the first signature to the second signature includes determining that the first signature matches the second signature; and the at least one action includes resuming execution of the software using the first data stored in the volatile memory device to control the at least one function for a vehicle.

In one embodiment, the first data further includes an output from a machine-learning model having the sensor data as an input.

In one embodiment, a method includes: prior to entering a standby mode, generating a first signature for data stored in volatile memory, the stored data including sensor and/or other data obtained from at least one sensor and/or other source; storing the first signature in non-volatile memory; after storing the first signature, signaling the volatile memory to change from a first mode of operation to the standby mode; signaling the volatile memory to exit the standby mode; after exiting the standby mode, generating a second signature for the data stored in the volatile memory; reading the first signature from the non-volatile memory; comparing the first signature to the second signature; and in response to comparing the first signature to the second signature, performing at least one action regarding the stored data.

In one embodiment, the at least one action includes, in response to determining that the first signature matches the second signature, restoring the first mode of operation by reading the stored data from the volatile memory.

In one embodiment, a computing system (e.g., a computing system of vehicle 102) includes the volatile memory and the non-volatile memory; and the at least one action includes, in response to determining that the first signature does not match the second signature, at least one of preventing use of the stored data in the volatile memory by the computing system, or booting the computing system from the non-volatile memory.

In one embodiment, power consumption by the volatile memory when in the standby mode is less than when in the first mode. In one example, power is maintained for protecting data in identified memory region 312 during the standby mode, but power is reduced or shut off for the region 314, which does not include data to be protected.

In one embodiment, generating the first signature includes determining an error correction code (e.g., ECC 322) for the stored data; and the at least one action includes, in response to determining that the first signature does not match the second signature, restoring at least a portion of the stored data using the error correction code.

In one embodiment, generating the first signature includes: sending, by a host device, a command to the volatile memory, where the volatile memory is configured to, in response to receiving the command, determine the first signature for the stored data; and receiving, by the host device, the first signature from the volatile memory.

In one embodiment, generating the first signature includes: sending, by a host device to a controller of the volatile memory, a request for the stored data; receiving, by the host device from the volatile memory, the stored data; and in response to receiving the stored data, determining, by the host device, the first signature.

In one embodiment, generating the first signature includes at least one of calculating a hash for the stored data by using a hash function, generating a cyclic redundancy check (CRC) for the stored data, or generating an error correction code for the stored data.

In one embodiment, the method further includes identifying a region (e.g., memory region 312) of the volatile memory for which the first signature is to be generated, where the first signature is determined for data stored in the identified region.

In one embodiment, the stored data is used to control at least one function of a vehicle; and identifying the region of the volatile memory includes determining the region based on an output from a machine-learning model, where an input to the machine-learning model includes data regarding an operating context of the vehicle.

In one embodiment, the data regarding the operating context of the vehicle is obtained from the at least one sensor. In one example, the context includes data regarding movement of the vehicle, and/or movement of objects other than the vehicle. In one example, the operating context includes data associated with identification of an object moving towards the vehicle.

In one embodiment, a non-transitory computer-readable medium stores instructions which, when executed on at least one computing device, cause the at least one computing device to: generate a first signature for first data stored in a volatile memory device, the first data including sensor and/or other data obtained from at least one sensor and/or other source of a vehicle or a mobile device; store the first signature in a non-volatile memory device; after storing the first signature, enter a standby mode; after exiting the standby mode, generate a second signature for the first data stored in the volatile memory device; read the first signature from the non-volatile memory device; compare the first signature to the second signature; and in response to comparing the first signature to the second signature, perform at least one action.

In one embodiment, a host central processing unit (e.g., host device 114) and a host boot memory (e.g., 108, 205) are located on the same silicon die so that communications with the host boot memory are not exposed external to the silicon die.

In one embodiment, the host boot memory stores boot code for booting by processing device 104 and loading an operating system. In one example, the host boot memory stores a region table to indicate protected regions of software stored in system memory 112. In one example, the protected regions are identified regions to be protected during standby.

In one embodiment, system memory 112 stores the operating state of an operating system and/or applications that are running at the time that the processing device 104 transitions from an active power state to a standby mode. After exiting the standby mode, the stored operating state can be used to resume operation that existed before entering the standby mode. In one example, applications that were previously loaded and running can resume to their same previous operating states.

In one embodiment, a verification process is performed during a resume of a computing system that is existing standby mode. The verification process generates an error when it detects that there is a signature mismatch. Thus, host device 114 can prevent the computer system from proceeding with the resume process so that malicious software cannot compromise the computer system.

In one embodiment, processing device 104 stores data in non-volatile memory device 108 indicating the quantity and/or addresses of identified regions that are protected. In one embodiment, processing device 104 receives input that causes exit from the standby mode. In one example, the input is a wake-up timer, or a service interrupt. In one example, processing device 104 regenerates signatures in the same manner as performed previously for comparing against the signatures stored in non-volatile memory. In one example, multiple signatures are generated and compared to prior signatures.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit)

component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media that store one or more sets of instructions.

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
at least one processing device; and
memory containing instructions configured to instruct the at least one processing device to:
prior to entering a standby mode, generate a first signature for first data stored in a volatile memory device, the first data including software executed to control at least one function;
store the first signature in a non-volatile memory device;
after storing the first signature, enter the standby mode;

exit the standby mode;
after exiting the standby mode, generate a second signature for the first data stored in the volatile memory device;
read the first signature from the non-volatile memory device;
compare the first signature to the second signature; and
in response to comparing the first signature to the second signature, perform at least one action regarding the stored first data; wherein performing the at least one action comprises, upon determining that the first signature does not match the second signature, booting a host device by reading the first data from the non-volatile memory device.

2. The system of claim 1, wherein the instructions are further configured to instruct the at least one processing device to:
store at least one key; and
prior to storing the first signature in the non-volatile memory device, encrypt the first signature using the at least one key.

3. The system of claim 1, wherein:
the host device stores data in the volatile memory device and the non-volatile memory device; and
the host device is powered down after the volatile memory device enters the standby mode.

4. The system of claim 1, wherein the at least one action further comprises at least one of:
sending, via a wireless network, a communication to a server in a cloud network, the communication indicating that the first signature does not match the second signature;
logging, in the non-volatile memory device, that the first signature does not match the second signature; or
updating, based on determining that the first signature does not match the second signature, training data used to train a machine-learning model, wherein an output from the machine-learning model is used to control the at least one function for a vehicle, and wherein the updated training data includes at least a portion of the first data.

5. The system of claim 1, wherein the instructions are further configured to instruct the at least one processing device to:
store at least one key; and
prior to comparing the first signature to the second signature, decrypt, using the at least one key, the first signature read from the non-volatile memory device.

6. The system of claim 1, wherein:
comparing the first signature to the second signature comprises determining that the first signature matches the second signature; and
the at least one action comprises resuming execution of the software using the first data stored in the volatile memory device to control the at least one function for a vehicle.

7. The system of claim 6, wherein the software controls the at least one function based on sensor data received from at least one sensor, and the first data further includes an output from a machine-learning model having the sensor data as an input.

8. A method comprising:
prior to entering a standby mode, generating a first signature for data stored in volatile memory;
storing the first signature in non-volatile memory;
after storing the first signature, signaling the volatile memory to change from a first mode of operation to the standby mode;
signaling the volatile memory to exit the standby mode;
after exiting the standby mode, generating a second signature for the data stored in the volatile memory;
reading the first signature from the non-volatile memory;
comparing the first signature to the second signature; and
in response to comparing the first signature to the second signature, performing at least one action regarding the stored data;
wherein performing the at least one action comprises, upon determining that the first signature does not match the second signature, booting a host device by reading the first data from the non-volatile memory device.

9. The method of claim 8, wherein the at least one action comprises, in response to determining that the first signature matches the second signature, restoring the first mode of operation by reading the stored data from the volatile memory.

10. The method of claim 8, wherein:
a computing system comprises the volatile memory and the non-volatile memory; and
the at least one action comprises, in response to determining that the first signature does not match the second signature, preventing use of the stored data in the volatile memory by the computing system.

11. The method of claim 8, wherein power consumption by the volatile memory when in the standby mode is less than when in the first mode.

12. The method of claim 8, wherein:
generating the first signature comprises determining an error correction code for the stored data; and
the at least one action comprises, in response to determining that the first signature does not match the second signature, restoring at least a portion of the stored data using the error correction code.

13. The method of claim 8, wherein generating the first signature comprises:
sending, by the host device, a command to the volatile memory, wherein the volatile memory is configured to, in response to receiving the command, determine the first signature for the stored data; and
receiving, by the host device, the first signature from the volatile memory.

14. The method of claim 8, wherein generating the first signature comprises:
sending, by the host device to a controller of the volatile memory, a request for the stored data;
receiving, by the host device from the volatile memory, the stored data; and
in response to receiving the stored data, determining, by the host device, the first signature.

15. The method of claim 8, wherein generating the first signature comprises at least one of calculating a hash for the stored data by using a hash function, generating a cyclic redundancy check (CRC) for the stored data, or generating an error correction code for the stored data.

16. The method of claim 8, further comprising identifying a region of the volatile memory for which the first signature is to be generated, wherein the first signature is determined for data stored in the identified region.

17. The method of claim 16, wherein:
the stored data is used to control at least one function of a vehicle; and
identifying the region of the volatile memory comprises determining the region based on an output from a machine-learning model, wherein an input to the machine-learning model comprises data regarding an operating context of the vehicle.

18. The method of claim 17, wherein the stored data includes sensor data obtained from at least one sensor, and the data regarding the operating context of the vehicle is obtained from the at least one sensor.

19. A non-transitory computer-readable medium storing instructions which, when executed on at least one computing device, cause the at least one computing device to:
   generate a first signature for first data stored in a volatile memory device, the first data including data obtained from at least one sensor or other data source of a vehicle or a mobile device;
   store the first signature in a non-volatile memory device;
   after storing the first signature, enter a standby mode;
   after exiting the standby mode, generate a second signature for the first data stored in the volatile memory device;
   read the first signature from the non-volatile memory device;
   compare the first signature to the second signature; and
   in response to comparing the first signature to the second signature, perform at least one action;
   wherein performing the at least one action comprises, upon determining that the first signature does not match the second signature, booting the host device by reading the first data from the non-volatile memory device.

* * * * *